United States Patent
Slaughter et al.

(10) Patent No.: US 9,308,481 B2
(45) Date of Patent: Apr. 12, 2016

(54) ENGINE CRANKCASE BREATHER WITH MESH FILTER

(71) Applicant: Caterpillar, Inc., Peoria, IL (US)

(72) Inventors: Seth Slaughter, Peoria, IL (US);
Shailendra Kardile, Peoria, IL (US);
Kathleen Nackers, East Peoria, IL (US);
Andreia Balan, Dunlap, IL (US); Jason Rex Dare, Peoria, IL (US); Eric Nathan Lucas, Washington, IL (US);
Christopher David Moore, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 13/940,821

(22) Filed: Jul. 12, 2013

(65) Prior Publication Data

US 2015/0013624 A1  Jan. 15, 2015

(51) Int. Cl.
| | |
|---|---|
| F02B 25/06 | (2006.01) |
| F01M 13/00 | (2006.01) |
| F02M 25/00 | (2006.01) |
| F02B 77/08 | (2006.01) |
| B01D 46/00 | (2006.01) |
| F01M 13/04 | (2006.01) |
| F02M 25/06 | (2006.01) |

(52) U.S. Cl.
CPC ....... B01D 46/0005 (2013.01); F01M 13/0405 (2013.01); *B01D 2279/35* (2013.01); *F01M 2013/0438* (2013.01); *F02M 25/06* (2013.01)

(58) Field of Classification Search
CPC .......... F01M 13/04; F01M 2013/0438; F01M 13/00; F01M 13/021; F02M 25/06; F02M 35/024; F02B 77/13; F02B 63/02
USPC ....... 123/573, 572, 198 R, 41.86, 574, 198 E; 55/385.3, 495, 423, 276
See application file for complete search history.

(56) References Cited

U.S. PATENT DOCUMENTS

| | | | | |
|---|---|---|---|---|
| 4,234,328 | A | | 11/1980 | Hudson, Jr. |
| 4,401,093 | A | * | 8/1983 | Gates et al. .................. 123/573 |
| 5,450,835 | A | * | 9/1995 | Wagner ....................... 123/573 |
| 5,479,907 | A | | 1/1996 | Walker, Jr. |
| 5,617,834 | A | * | 4/1997 | Lohr ............................ 123/572 |

FOREIGN PATENT DOCUMENTS

EP           2112346 A1    10/2009

* cited by examiner

*Primary Examiner* — Lindsay Low
*Assistant Examiner* — Syed O Hasan
(74) *Attorney, Agent, or Firm* — Baker & Hostetler LLP

(57) ABSTRACT

An engine crankcase breather includes a housing having a lower end including an inlet opening and an upper end including an outlet opening. The inlet opening lies in a horizontal plane and the outlet opening lies in a vertical plane. A mesh filter is positioned within the housing and includes opposing inlet and outlet faces defining a mesh filter thickness. The inlet and outlet faces are parallel to the inlet opening and are positioned below a central axis through the outlet opening. A bottom wall of the housing defines a portion of the lower end and includes a downward slope toward a lip defining the inlet opening. The mesh filter is spaced above the bottom wall. The engine crankcase breather also includes a plurality of oil return openings through the lip.

15 Claims, 2 Drawing Sheets

ENGINE CRANKCASE BREATHER WITH MESH FILTER

TECHNICAL FIELD

The present disclosure relates generally to an engine crankcase breather having a mesh filter.

BACKGROUND

During an engine operation, some combustion gases, generally referred to as blow-by gases, may leak from an engine cylinder into a crankcase. These gases may increase pressure in the crankcase and may also mix with oil particles present in the crankcase. To relieve the pressure in the crankcase, these gases are typically vented out of the crankcase. For example, the crankcase exhaust may be vented to the atmosphere or returned to the engine intake manifold. In some instances, government regulations require the use of a crankcase ventilation system. These ventilation systems often incorporate a filter or device for removing the oil particles present in the crankcase exhaust, before releasing or re-circulating the exhaust.

An exemplary crankcase breather is taught in U.S. Pat. No. 4,234,328 to Hudson, Jr. ("Hudson"). The breather of Hudson includes upper and lower shell members defining a canister shell. Oil laden gaseous fluid is introduced into an intermediate chamber of the canister and directed by a vane member to flow in an orbital path around the intermediate chamber and create a vortex region. Gaseous liquid with oil removed then flows out of the intermediate chamber and into an upper chamber through a perforated chimney located in the vortex region. Oil drains from the intermediate chamber into the bottom of the lower chamber through an elongate aperture in the lower shell member outside the vortex region. Although the breather of Hudson may provide suitable oil removal for some applications, it should be appreciated that a continuing need exists for providing improved bulk oil removal within predetermined constraints.

The present disclosure is directed to one or more of the problems or issues set forth above.

SUMMARY OF THE DISCLOSURE

In one aspect, an engine crankcase breather includes a housing having a lower end including an inlet opening and an upper end including an outlet opening. The inlet opening lies in a horizontal plane and the outlet opening lies in a vertical plane. A mesh filter is positioned within the housing and includes opposing inlet and outlet faces defining a mesh filter thickness. The inlet and outlet faces are parallel to the inlet opening and are positioned below a central axis through the outlet opening. A bottom wall of the housing defines a portion of the lower end and includes a downward slope toward a lip defining the inlet opening. The mesh filter is spaced above the bottom wall. The engine crankcase breather also includes a plurality of oil return openings through the lip.

In another aspect, an engine includes a cylinder block defining a cylinder and including a crankcase. An engine crankcase breather is positioned over an opening to the crankcase. The engine crankcase breather includes a housing having a lower end including an inlet opening and an upper end including an outlet opening. The inlet opening lies in a horizontal plane and the outlet opening lies in a vertical plane. A mesh filter is positioned within the housing and includes opposing inlet and outlet faces defining a mesh filter thickness. The inlet and outlet faces are parallel to the inlet opening and are positioned below a central axis through the outlet opening. A bottom wall of the housing defines a portion of the lower end and includes a downward slope toward a lip defining the inlet opening. The mesh filter is spaced above the bottom wall. The engine crankcase breather also includes a plurality of oil return openings through the lip.

In yet another aspect, a method of removing bulk oil from an exhaust of a crankcase using an engine crankcase breather is provided. The engine crankcase breather includes a housing having a lower end including an inlet opening and an upper end including an outlet opening. The inlet opening lies in a horizontal plane and the outlet opening lies in a vertical plane. A mesh filter is positioned within the housing and includes opposing inlet and outlet faces defining a mesh filter thickness. The inlet and outlet faces are parallel to the inlet opening and are positioned below a central axis through the outlet opening. A bottom wall of the housing defines a portion of the lower end and includes a downward slope toward a lip defining the inlet opening. The mesh filter is spaced above the bottom wall. The engine crankcase breather also includes a plurality of oil return openings through the lip. The method includes a step of advancing the exhaust along a common path defined sequentially by the inlet opening of the housing, the inlet face of the mesh filter, the outlet face of the mesh filter, and the outlet opening of the housing. Exhaust is blocked from entering the mesh filter at a central region of the inlet face of the mesh filter using a support mechanism supported above and vertically aligned with the inlet opening. The support mechanism contacts the central region of the inlet face of the mesh filter. The method also includes steps of capturing the bulk oil in the mesh filter, and passing the bulk oil returned from the mesh filter using gravity along the downward slope and through one of the oil return openings.

DETAILED DESCRIPTION

Figure 1:
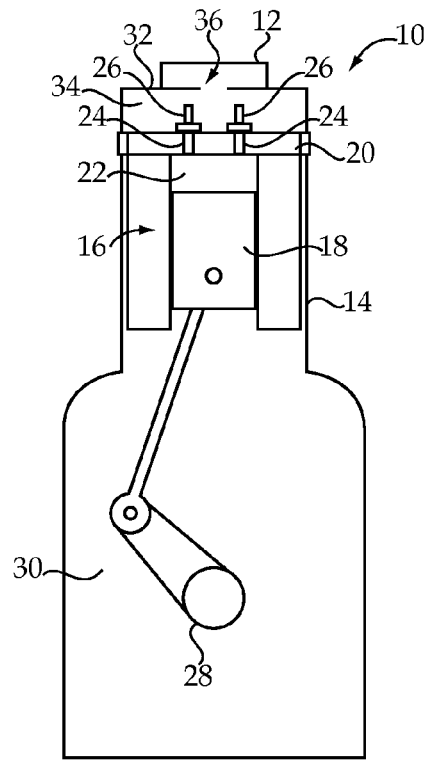
FIG. 1 is a side diagrammatic view of an engine incorporating an engine crankcase breather, according to the present disclosure.

FIG. 1 illustrates an internal combustion engine 10 incorporating an engine crankcase breather 12. The engine 10 includes a cylinder block 14 defining at least one cylinder 16, which has a piston 18 reciprocating therein. A cylinder head 20 is coupled to the cylinder block 14 to enclose the cylinder 16 and form a combustion chamber 22. The cylinder head 20 may also define fluid passages 24 to the combustion chamber 22 and may support valves 26 for selectively opening and closing the fluid passages 24. The piston 18 transfers force created during combustion to a crankshaft 28, which translates reciprocating linear piston motion into rotation. A crankcase 30, which may be integral with the cylinder block 14, is positioned below the cylinder 16 and houses the crankshaft 28. A valve cover 32 is positioned over the valves 26 and defines a cavity 34 that is integral with or in fluid communication with the crankcase 30. Both the crankcase 30 and the valve cover 32 may function to keep oil or lubricant in and dirt or other contaminants out.

The engine crankcase breather 12 may be supported on the valve cover 32 and, more particularly, may be positioned over an opening 36, which may be defined by the valve cover 32, to the crankcase 30. During operation of the engine 10, a small amount of combustion byproducts, including unburned fuel and exhaust gases, may escape from the cylinder 16 and enter the crankcase 30. This "exhaust" is commonly referred to as "blow-by." If not controlled, the blow-by can contaminate the lubricating oil and pressurize the crankcase 30. To avoid potential issues that may result, the engine 10 may include a crankcase ventilation system to vent the blow-by from the crankcase 30. In particular, the engine crankcase breather 12 may be configured to release the blow-by to the atmosphere, or elsewhere, depending on the particulars of the crankcase ventilation system. To control emissions, the engine crankcase breather 12 disclosed herein also functions to remove bulk oil from the vented blow-by.

Figure 2:
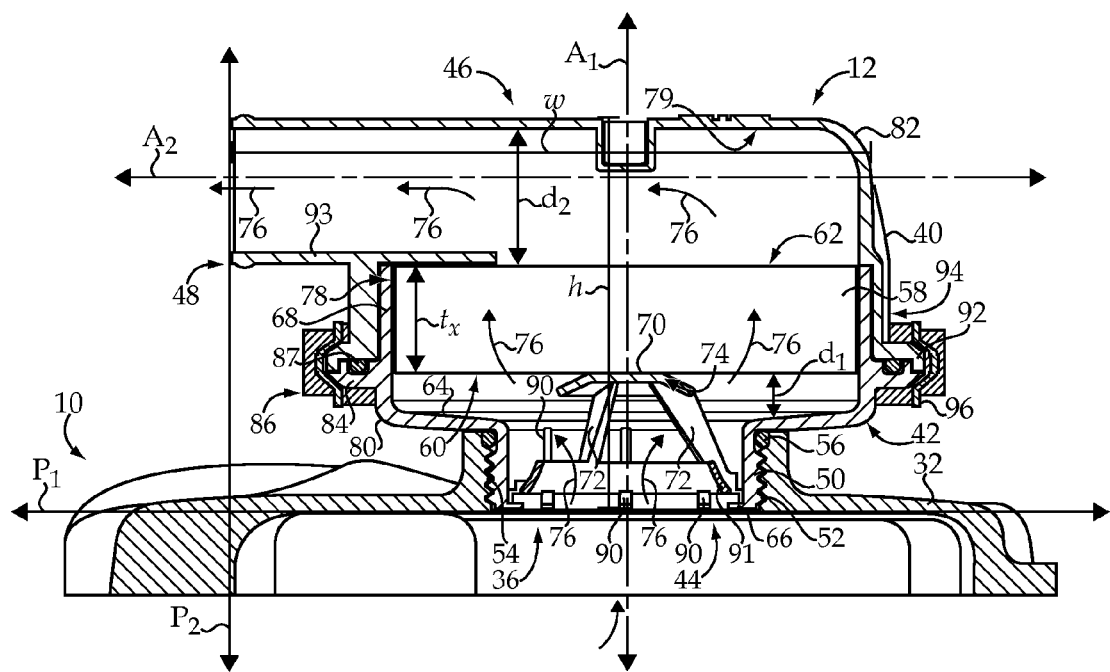
FIG. 2 is a cross-sectional view through the engine crankcase breather, shown in an installed configuration.

An exemplary embodiment of the engine crankcase breather 12 is shown in greater detail in FIG. 2. The engine crankcase breather 12 includes a housing 40 having a generally cylindrical shape. Although a cylindrical shape is shown, alternative shapes may be suitable as well. The housing 40 has a lower end 42 including an inlet opening 44 and an upper end 46 including an outlet opening 48. According to the exemplary embodiment, the inlet opening 44 and the outlet opening 48 may lie in perpendicular planes. That is, the inlet opening 44 lies in a horizontal plane $P_1$ and the outlet opening lies in a vertical plane $P_2$, with particular reference to an installed configuration, as shown. As used herein, "horizontal" may mean more horizontal than vertical, while "vertical" may refer to something that is more vertical than horizontal. The housing 40 may have a relatively flat cylindrical shape. That is, a height h of the engine crankcase breather 12 measured along a central axis $A_1$ through the inlet opening 44 may be less than a width w of the engine crankcase breather 12 measured along the central axis $A_2$ through the outlet opening 48.

As shown, the engine crankcase breather 12 may be attached to the valve cover 32. According to the particular embodiment, the inlet opening 44 of the housing 40 may be defined by a downwardly extending flange 50 having external threads 52. The external threads 52 may threadably engage internal threads 54 of the valve cover opening 36 to form the installed configuration of the engine crankcase breather 12. According to the installed configuration, the engine crankcase breather 12 is fluidly connected to the crankcase 30, shown in FIG. 1, such that blow-by, or crankcase exhaust, may be vented to the atmosphere or elsewhere using the engine crankcase breather 12. A seal 56, or other device capable of sealing the connection between the engine crankcase breather 12 and the valve cover 32, may also be provided.

A mesh filter 58 is positioned within the housing 40 and includes opposing inlet and outlet faces 60 and 62 defining a mesh filter thickness tx. The mesh filter 58 may be made from metal and, according to some embodiments, may be an aluminum wire mesh. A density of the mesh filter 58 may be between about four percent and about eight percent and, according to a specific example, may be about six percent. The mesh density, along with other variables relating to the mesh filter 58, including the mesh filter thickness tx, may be arrived at through testing to achieve desirable results for the specific application. For example, computational fluid dynamics may be used to arrive at preferred configurations. The mesh filter 58 may be positioned within the housing 40 such that the inlet and outlet faces 60 and 62 are parallel to the inlet opening 44, with the inlet face 60 facing the inlet opening 44. As shown, both of the inlet and outlet faces 60 and 62 may be positioned below the central axis $A_2$ through the outlet opening 48. In fact, the inlet and outlet faces 60 and 62 may be positioned below the entire outlet opening 48.

A bottom wall 64 of the housing 40 defines a portion of the lower end 42 and includes a downward slope toward a lip 66 defining the inlet opening 44. In particular, the bottom wall 64 may be inwardly declined from an outer sidewall 68 of the lower end 42 to the downwardly extending flange 50, which defines a steep downward slope leveling off at the lip 66 and terminating at the inlet opening 44. The mesh filter 58 is spaced above the bottom wall 64 a first predetermined distance $d_1$. For example, a support mechanism, or platform, 70 may be supported above and vertically aligned with the inlet opening 44. A plurality of support legs 72 may extend from the lip 66, or other portion of the lower end 42, to the support mechanism 70 to maintain the mesh filter 58 at the predetermined position spaced above the inlet opening 44. The support mechanism 70 may have a height substantially corresponding with the first predetermined distance $d_1$. In addition, the support mechanism 70 may be solid and may contact the mesh filter 58 at a central region 74 of the inlet face 60 of the mesh filter 58.

Fluid flow through the engine crankcase breather 12 may be restricted to a common path, depicted by arrows 76, defined sequentially by the inlet opening 44 of the housing 40, the inlet face 60 of the mesh filter 58, the outlet face 62 of the mesh filter 58, and the outlet opening 48 of the housing 40. That is, the engine crankcase breather 12 may be configured such that all crankcase exhaust passing through the engine crankcase breather 12 passes entirely through the mesh filter 58 and is not able to bypass all or a portion of the mesh filter 58 as the exhaust passes from the inlet opening 44 toward and through the outlet opening 48. For example, an edge 78 of the mesh filter 58, defining the thickness tx of the mesh filter 58, may contact an inner surface of the outer sidewall 68. As shown, the common path 76 may generally include a vertical segment extending from the inlet opening 44 and through the thickness tx of the mesh filter 58. Portions of the vertical segment of exhaust flow may be deflected outward, toward a periphery of the inlet face 60 of the mesh filter 58 by the support mechanism 70. The common path 76 also includes a horizontal segment extending from the mesh filter 58 to the outlet opening 48. As shown, a second predetermined distance $d_2$ may be provided between the outlet face 62 of the mesh filter 58 and an upper wall 79 of the housing 40.

Figure 3:
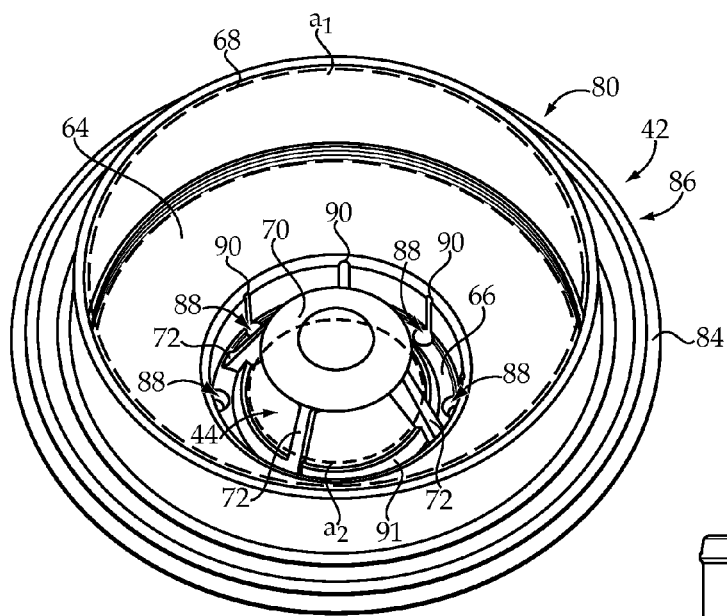
FIG. 3 is a perspective view of the base of the engine crankcase breather of FIG. 2.

The housing 40 may be a two-piece housing and may generally include a base 80 defining the lower end 42 and a cover 82 defining the upper end 46. Referring also to FIG. 3, the base 80 may be bowl-shaped and may include a laterally extending attachment flange 84 at a periphery 86 of the base 80. The laterally extending attachment flange 84 may be shaped, as shown, to receive a sealing member 87 (FIG. 2). The base 80 may include the support mechanism 70 and support legs 72 extending from the lip 66 to the support mechanism 70. As shown in FIG. 3, the lip 66 may include a plurality of oil return openings 88 extending therethrough. The bottom wall 64 may also include grooves 90 extending along the downward slope of the bottom wall 64 and terminating at a respective one of the oil return openings 88. In particular, the grooves 90 may be provided in an inner surface of the bottom wall 64 along the downwardly extending flange 50.

An upwardly extending flange 91 may extend from the lip 66 and may be substantially parallel with the legs 72. The flange 91 may function to reduce re-entrainment of oil draining toward the oil return openings 88 into the blow-by entering the breather 12 through the inlet opening 44. To further reduce re-entrainment of returned oil into the engine crankcase breather 12, and as best shown in FIG. 2, a plurality of shields may be provided to block the blow-by gases entering the engine crankcase breather 12 from passing upward through the oil return openings 88. In particular, one or more shields may be positioned below the oil return openings 88 and, according to some embodiments, may lie in the same plane as the inlet opening 44 or a plane that is substantially parallel to the inlet opening 44.

Figure 4:
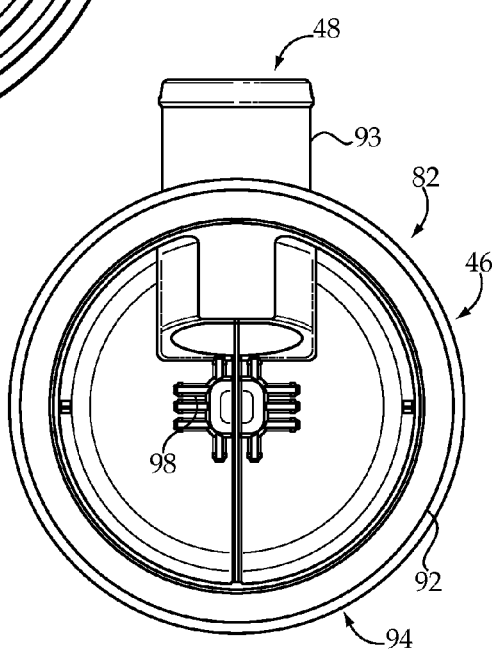
FIG. 4 is a bottom perspective view of the cover of the engine crankcase breather of FIG. 2.

Referring also to FIG. 4, the cover 82 may also be bowl-shaped and may be configured such that, when inverted relative to the depicted orientation, the cover 82 mates with the base 80. A wall 93 defining the outlet opening 48 may project into the space defined by the cover 82 an amount sufficient to reduce oil carryover. For example, during operation the breather 12 may become tilted relative to the central axis $A_1$, sometimes being tilted as much as 45 degrees. By projecting the wall 93 into the cover 82, above the mesh filter 58, and toward the central axis $A_1$, the release of accumulated oil within the mesh filter 58 and/or the base 80 through the outlet opening 48 may be reduced.

Figure 5:
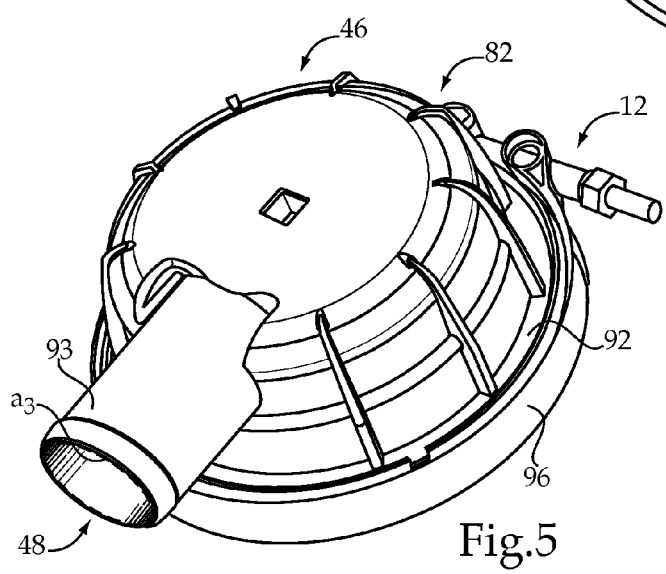
FIG. 5 is a top perspective view of the engine crankcase breather, depicting a clamp shown in a locked configuration.

The cover 82 may also include a laterally extending attachment flange 92, extending at a periphery 94 of the cover 82. With continued reference to FIGS. 2-4 and referring also to FIG. 5, a clamp 96, such as, for example, a Marman clamp, may be positioned around the housing 40 at an intersection between the base 80 and the cover 82. The clamp 96 may have a locked positioned, as shown, in which the laterally extending attachment flange 84 of the base 80 and the laterally extending attachment flange 92 of the cover 82 are held in contact.

Installing and/or performing maintenance on the engine crankcase breather 12 may be simplified and eased with respect to previous designs. In particular, only an appropriately sized socket may be required for tightening or loosening the clamp 96, which secures together the base 80 and cover 82. To tighten or loosen the entire housing 40 relative to the valve cover 32, a drive socket 98, which may be reinforced as shown in FIG. 4, may be provided in the cover 82.

In addition to modifying the mesh thickness tx and/or mesh density, as mentioned above, a cross-sectional area $a_1$ of the mesh filter 58 (FIG. 3) or, more particularly, cross-sectional areas of each of the inlet and outlet faces 60 and 62, which may be the same, may be modified. It should be appreciated that the cross-sectional area $a_1$ of the mesh filter 58 may match a space or area defined by the lower end 42 of the housing 40 such that all exhaust passing from the inlet opening 44 to the outlet opening 44 must pass through the mesh filter 58. According to some embodiments, it may be desirable to maximize the cross-sectional area $a_1$ of the inlet face 60 of the mesh filter 58 within the constraints of the particular application and, according to such embodiments, the cross-sectional area $a_1$ of the inlet face 60 may be greater than a cross-sectional area $a_2$ (FIG. 3) of the inlet opening 44. According to some embodiments, the cross-sectional area $a_1$ of the inlet face 60 may be at least two times the cross-sectional area $a_2$ of the inlet opening 44 of the housing 40.

INDUSTRIAL APPLICABILITY

The present disclosure may be applicable to engines having a crankcase or other similar chamber that requires venting. Further, the present disclosure is applicable to venting devices, or breathers, that also include a mechanism for removing contaminants from the vented exhaust. In particular, the filtering mechanism may be configured for removing bulk oil from the vented exhaust. As such, the present disclosure may be applicable to a variety of engines and the on-highway or off-highway machines that utilize those engines.

Referring generally to FIGS. 1-5, an engine 10 includes a cylinder block 14 defining at least one cylinder 16, which has a piston 18 reciprocating therein. A cylinder head 20 is coupled to the cylinder block 14 to enclose the cylinder 16 and form a combustion chamber 22. The piston 18 transfers force created during combustion occurring within the combustion chamber 22 to a crankshaft 28, which translates reciprocating linear piston motion into rotation. A crankcase 30, which may be integral with the cylinder block 14, is positioned below the cylinder 16 and houses the crankshaft 28. During operation of the engine 10, a small amount of combustion byproducts, including unburned fuel and exhaust gases, may escape from the cylinder 16 and enter the crankcase 30. This "exhaust" is commonly referred to as "blow-by." The elements found in blow-by may include wear particles, oil, fuel, gas, and air.

An engine crankcase breather 12, including a mesh filter 58, as disclosed herein, may be used to vent the crankcase exhaust and remove bulk oil from those emissions. Although it is suggested above that the engine crankcase breather 12 may vent the crankcase exhaust, or blow-by, to the atmosphere, it should be appreciated that the engine crankcase breather 12 may be used in a variety of other crankcase ventilation systems. For example, some crankcase ventilation systems may route the crankcase exhaust into the engine intake manifold. According to this arrangement and others, additional filters and/or devices may be provided to also receive and/or treat the crankcase exhaust. According to one example, a device for filtering mist oil from the crankcase exhaust may also be utilized.

As shown in the exemplary embodiment, the engine crankcase breather 12 may be threaded into an opening 36 through a valve cover 32. However, the engine crankcase breather 12 may be attached at other engine locations, as long as the engine crankcase breather 12 is in fluid communication with the crankcase 30. As stated above, the engine crankcase breather 12 is configured to receive crankcase exhaust and capture the bulk oil from the exhaust. In particular, the crankcase exhaust may be advanced along a common path 76 defined sequentially by an inlet opening 44 of the engine crankcase breather housing 40, an inlet face 60 of the mesh filter 58, an outlet face 62 of the mesh filter 58, and an outlet opening 48 of the housing 40. The exhaust may be blocked from passing through a central region 74 of the inlet face 60 of the mesh filter 58 using a support mechanism 70, which supports the mesh filter 58 a predetermined distance above a bottom wall 64 of the housing 40. As a result, the exhaust may be directed to portions of the inlet face 60 surrounding the central region 74.

Bulk oil in the exhaust may be captured using the mesh filter 58. The bulk oil may coalesce in the mesh filter 58 and fall, using gravity, from the mesh filter 58. The bulk oil returned from the mesh filter 58 using gravity may pass along the downward slope of the bottom wall 64, through one or more grooves 90, and through at least one of a plurality of oil return openings 88. The oil return openings 88 are provided through a lip 66 of the bottom wall 64 that defines the inlet opening 44. As such, the returned oil is directed through openings 88 that are circumferentially spaced from the inlet opening 44 so the returned oil is not reintroduced into the crankcase exhaust vented through the engine crankcase breather 12.

The engine crankcase breather 12 disclosed herein provides an effective means for removing bulk oil from crankcase exhaust, or blow-by. The engine crankcase breather 12 uses a high efficiency mesh filter 58 having a cross-sectional area $a_1$ greater than the cross-sectional area $a_2$ of the inlet opening 44. That is, the cross-sectional area $a_1$ of the mesh filter 58 is maximized, particularly relative to conventional designs, given predetermined spatial constraints. The configuration of the engine crankcase breather 12 does not permit any of the exhaust from bypassing any portion of the mesh filter 58 but, instead, requires passage of the crankcase exhaust through the entirety of the mesh filter 58.

The exhaust is generally directed upward through the mesh filter 58 and then laterally through the outlet opening 48. Sizes of the inlet opening 44 and the outlet opening 48 (shown at $a_3$ in FIG. 5), along with distances $d_1$ and $d_2$ above and below the mesh filter 58, are selected to induce substantially even flow distribution through the mesh filter 58. In addition, the support mechanism 70 functions also to deflect the upward flow from entering the mesh filter 58 exclusively through the central region 74 of the inlet face 60 of the mesh filter 58. The bulk oil captured with the mesh filter 58 is ultimately returned to the crankcase 30 using gravity through oil return openings 88 provided in an annular arrangement surrounding the inlet opening 44.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine crankcase breather, comprising:
   a housing having a lower end including an inlet opening and an upper end including an outlet opening, wherein the inlet opening lies in a horizontal plane and the outlet opening lies in a vertical plane;
   a mesh filter positioned within the housing and including opposing inlet and outlet faces defining a mesh filter thickness, wherein the inlet and outlet faces are parallel to the inlet opening and are positioned below a central axis through the outlet opening;
   a bottom wall of the housing defining a portion of the lower end and including a downward slope toward a lip defining the inlet opening, wherein the mesh filter is spaced above the bottom wall;
   a plurality of oil return openings through the lip;
   a support mechanism supported above and vertically aligned with the inlet opening, wherein the support mechanism contacts a central region of the inlet face of the mesh filter; and
   a plurality of support legs extending from the lip to the support mechanism,
     wherein fluid flow through the engine crankcase breather is restricted to a common path defined sequentially by the inlet opening of the housing, the inlet face of the mesh filter, the outlet face of the mesh filter, and the outlet opening of the housing.

2. The engine crankcase breather of claim 1, wherein the housing includes a base defining the lower end and including a laterally extending attachment flange at a periphery of the base, and a cover defining the upper end and including a laterally extending attachment flange at a periphery of the cover.

3. The engine crankcase breather of claim 2, further including a clamp positioned around the housing at an intersection between the base and the cover and having a locked position in which the laterally extending attachment flange of the base and the laterally extending attachment flange of the cover are held in contact.

4. The engine crankcase breather of claim 1, wherein a height of the engine crankcase breather measured along a central axis through the inlet opening is less than a width of the engine crankcase breather measured along the central axis through the outlet opening.

5. The engine crankcase breather of claim 1, wherein the cross-sectional area of the inlet face of the mesh filter is at least two times the cross-sectional area of the inlet opening of the housing.

6. The engine crankcase breather of claim 1, wherein a density of the mesh filter is between about 4 percent and about 8 percent.

7. The engine crankcase breather of claim 1, wherein the outlet opening is defined by a wall that contacts the outlet face of the mesh filter so as to capture the mesh filter.

8. The engine crankcase breather of claim 1, wherein the support mechanism is a platform configured to deflect exhaust flow outward, toward a periphery of the inlet face of the mesh filter.

9. An engine, comprising:
   a cylinder block defining a cylinder and including a crankcase; and
   an engine crankcase breather positioned over an opening to the crankcase, wherein the engine crankcase breather includes:
     a housing having a lower end including an inlet opening and an upper end including an outlet opening, wherein the inlet opening lies in a horizontal plane and the outlet opening lies in a vertical plane;
     a mesh filter positioned within the housing and including opposing inlet and outlet faces defining a mesh filter thickness, wherein the inlet and outlet faces are parallel to the inlet opening and are positioned below a central axis through the outlet opening;
     a bottom wall of the housing defining the lower end and including a downward slope toward a lip defining the inlet opening, wherein the mesh filter is spaced above the bottom wall;
     a plurality of oil return openings through the lip;
     a support mechanism supported above and vertically aligned with the inlet opening, wherein the support mechanism contacts a central region of the inlet face of the mesh filter; and
     a plurality of support legs extending from the lip to the support mechanism.

10. The engine of claim 9, further including:
    a cylinder head coupled to the cylinder block; and
    a valve cover mounted on the cylinder head and defining the opening to the crankcase, wherein the opening includes internal threads,
    wherein the inlet opening of the housing is defined by a downwardly extending flange including external threads, and
    wherein the internal threads and the external threads are engaged in an installed configuration of the engine crankcase breather.

11. The engine of claim 9, wherein the housing includes a base defining the lower end and including a laterally extending attachment flange at a periphery of the base, and a cover defining the upper end and including a laterally extending attachment flange at a periphery of the cover.

12. The engine of claim 11, further including a clamp positioned around the housing at an intersection between the base and the cover and having a locked position in which the laterally extending attachment flange of the base and the laterally extending attachment flange of the cover are held in contact.

13. The engine of claim 9, wherein a cross-sectional area of the inlet face of the mesh filter is at least two times a cross-sectional area of the inlet opening of the housing.

14. A method for removing bulk oil from an exhaust of a crankcase using an engine crankcase breather, the engine crankcase breather including:
- a housing having a lower end including an inlet opening and an upper end including an outlet opening, wherein the inlet opening lies in a horizontal plane and the outlet opening lies in a vertical plane; a mesh filter positioned within the housing and including opposing inlet and outlet faces defining a mesh filter thickness, wherein the inlet and outlet faces are parallel to the inlet opening and are positioned below a central axis through the outlet opening; a bottom wall of the housing defining the lower end and including a downward slope toward a lip defining the inlet opening, wherein the mesh filter is spaced above the bottom wall; a plurality of oil return openings through the lip, the method comprising:
- advancing the exhaust along a common path defined sequentially by the inlet opening of the housing, the inlet face of the mesh filter, the outlet face of the mesh filter, and the outlet opening of the housing;
- blocking the exhaust from entering the mesh filter through a central region of the inlet face of the mesh filter using a support mechanism supported above and vertically aligned with the inlet opening, wherein the support mechanism contacts the central region of the inlet face of the mesh filter and is supported by a plurality of support legs extending from the lip to the support mechanism;
- capturing the bulk oil in the mesh filter; and
- passing the bulk oil returned from the mesh filter using gravity along the downward slope and through one of the oil return openings.

15. The method of claim 14, further including restricting flow of the exhaust through the engine crankcase breather to the common path.

* * * * *